W. A. ESTES.
PLOW.
No. 171,785. Patented Jan. 4, 1876.
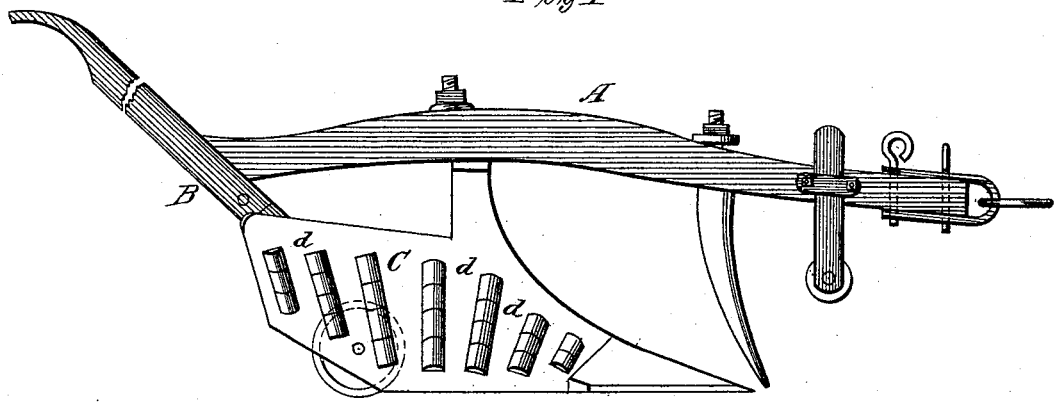
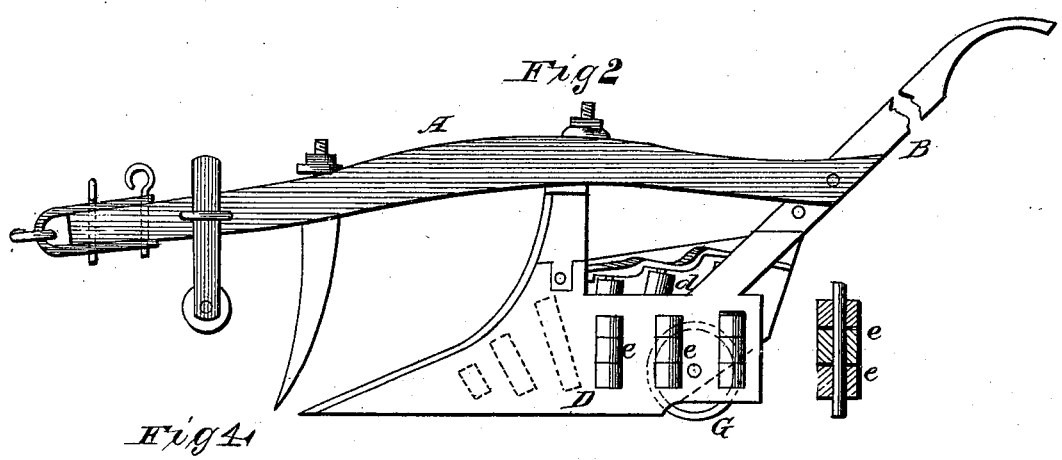
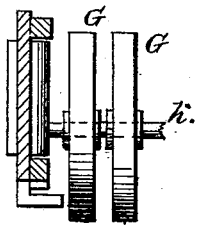
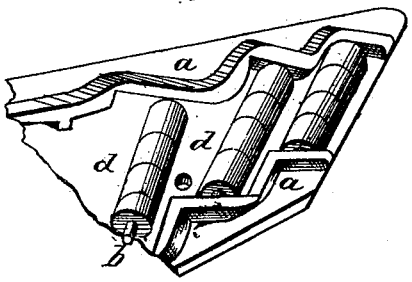
Witnesses
C. H. Watson
Wm B. Kipperman
Inventor
Wm A. Estes
per C. H. Watson & Co. Attorneys

UNITED STATES PATENT OFFICE.

WILLIAM A. ESTES, OF CHINA, MAINE.

IMPROVEMENT IN PLOWS.

Specification forming part of Letters Patent No. 171,785, dated January 4, 1876; application filed December 17, 1875.

*To all whom it may concern:*

Be it known that I, WILLIAM A. ESTES, of China, in the county of Kennebec and State of Maine, have invented certain new and useful Improvements in Plows; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention is to provide a simple and efficient means for relieving the plow from friction as it is drawn through the ground, as well as to allow it to be turned or swiveled around at the end of a furrow with greater ease and facility.

To this end the nature of my invention consists in the combination and arrangement of parts, all as hereinafter more fully set forth.

In the annexed drawing, Figure 1 is a side elevation, showing the mold-board side of a plow embodying my invention. Fig. 2 is a side elevation of the same, showing the land-side. Fig. 3 is a perspective view of a portion of the mold-board from the under side. Fig. 4 is a rear view of a part of the plow.

A represents the plow-beam, with handles B B, mold-board C, and land-side D, constructed and connected together in any of the known and usual ways.

Along the top and bottom, on the under side of the mold-board, are formed flanges $a$ $a$, in which a series of rods or shafts, $b$ $b$, are placed, and upon each rod or shaft $b$ are placed a series of friction-rolls, $d$ $d$, which project through slots in the mold-board slightly beyond the front surface thereof. The rods $b$ are set at varying angles, in such a manner that the several series of friction-rolls will come in contact with the furrow-slice being turned over at right angles to the various points of contact of the same with the mold-board throughout its entire length.

One series of rolls about the center of the mold-board is vertical, and the several series on each side thereof are inclined more and more from the same, as shown in Fig. 1; or, in other words, the several series of friction-rolls are set to conform to the curvature of the mold-board. There being a series of rolls upon each rod or shaft, and the rolls of each series acting independently of each other, they can all be made of the same size, and the upper rolls will rotate faster than the lower ones, as the furrow-slice and earth move faster the higher up they are on the mold-board. The land-side D is, in like manner, provided with several series of friction-rolls $e$ $e$, all set upon vertical rods or shafts, having their bearings in flanges on the inner side of the land-side.

By this arrangement of friction-rolls in the mold-board and land-side the draft is materially lessened, and the plow will pass much easier through the ground. At the heel of the plow is a horizontal shaft, $h$, having its bearings in the flanges on the mold-board and land-side, and upon this shaft are placed two wheels, G G, which allow of the plow being turned easily or moved from place to place without tipping to either side by simply bearing down on the handles.

Having thus fully described my invention, what I claim as new, and desire to secure by Letters Patent, is—

The mold-board C, having slots of sufficient size to admit the series of anti-friction rollers $d$ $d$, each series of rollers being upon the same shaft and of uniform size, and each roller revolving independently, in combination with the flanges $a$ $a$ and shafts $b$ $b$, constructed substantially as and for the purpose specified.

In testimony that I claim the foregoing as my own I affix my signature in presence of two witnesses.

WILLIAM A. ESTES.

Witnesses:
WM. B. UPPERMAN,
C. H. WATSON.